Oct. 14, 1952 R. B. BLACKMORE 2,613,708
METHOD OF CUTTING TIMBER AND CONNECTING THE SLABS
Filed Aug. 22, 1951 2 SHEETS—SHEET 1
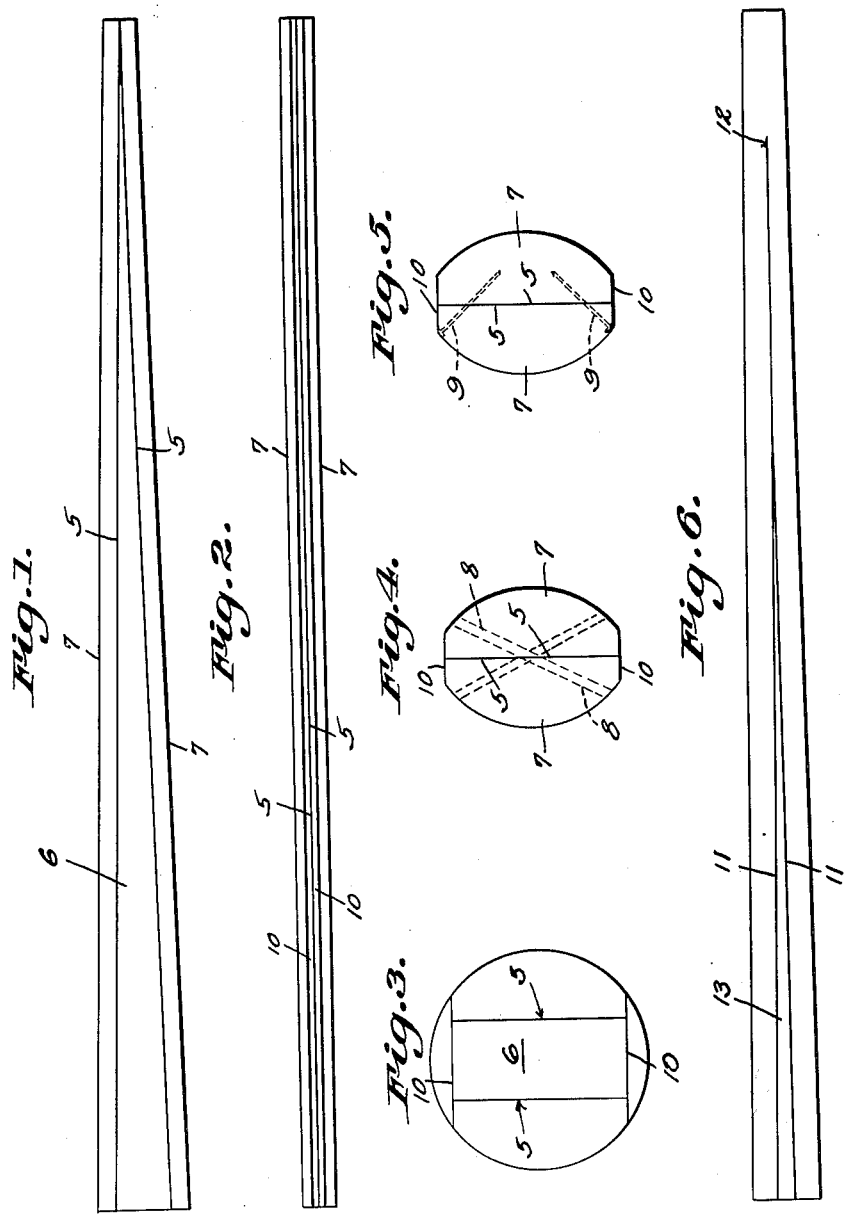
R. B. Blackmore
INVENTOR,
BY C. A. Snow & Co.
ATTORNEYS.

Oct. 14, 1952  R. B. BLACKMORE  2,613,708
METHOD OF CUTTING TIMBER AND CONNECTING THE SLABS
Filed Aug. 22, 1951  2 SHEETS—SHEET 2
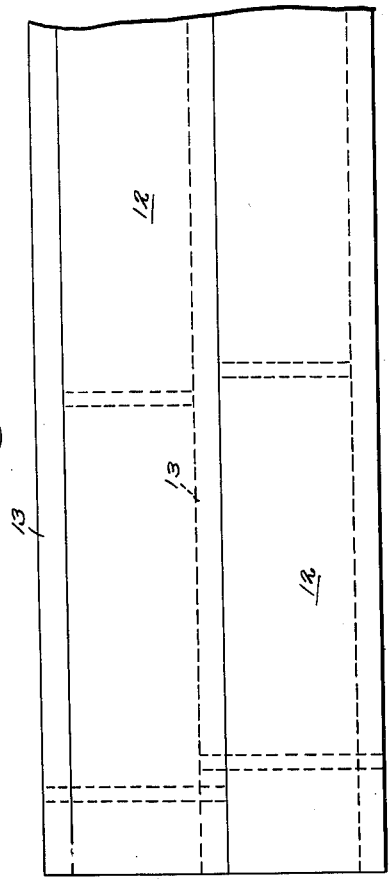
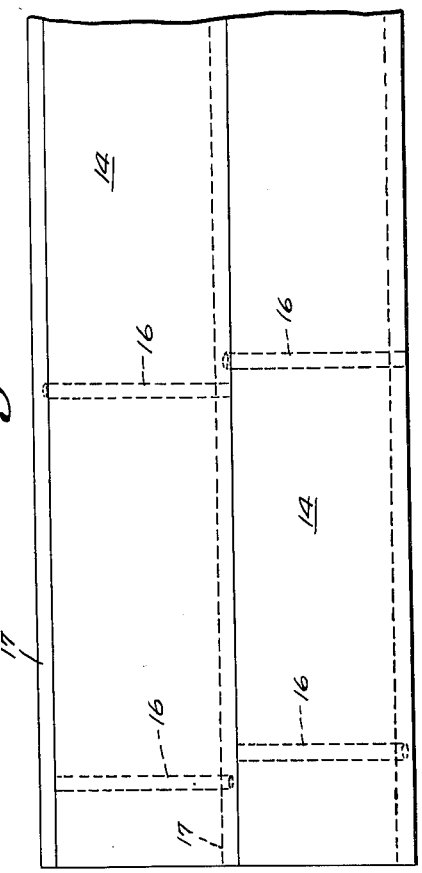
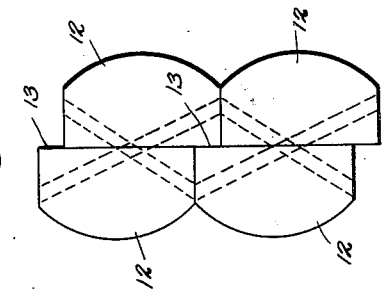
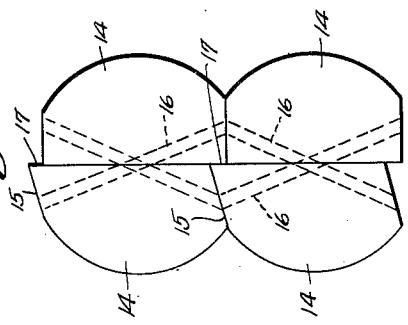
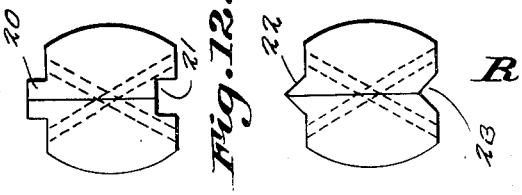
R. B. Blackmore
INVENTOR,
BY C. A. Snow & Co.
ATTORNEYS.

Patented Oct. 14, 1952

2,613,708

UNITED STATES PATENT OFFICE 2,613,708

METHOD OF CUTTING TIMBER AND OF CONNECTING THE SLABS

Robert B. Blackmore, Casper, Wyo.

Application August 22, 1951, Serial No. 243,107

4 Claims. (Cl. 144—309)

This invention relates to a method of sawing logs in the construction of timbers for use in building construction, the primary object of the invention being to provide a method of cutting logs which, when carried out, will provide logs for building purposes wherein the logs will have smooth top and bottom surfaces, the sides of the logs being substantially parallel and free of the original taper.

An important object of the invention is to saw logs in the formation of boards or slab sections so that when brought together in the formation of a log, a log is provided for convenient use in constructing buildings by superimposing the logs, the squared upper and lower surfaces of the logs presenting smooth surfaces for the true positioning of the logs, with respect to each other.

Another important object of the invention is to provide a method of cutting or sawing the usual tapered logs to produce logs of a uniform vertical thickness, and at the same time preserve the original surface contours and rustic appearance for constructing log cabins.

Still another object of the invention is to produce a log cut from the usual tapered timbers to provide shoulders along the upper and lower longitudinal edges of the logs so that the contacting surfaces of adjacent upper and lower logs of a building wall, may be interlocked, insuring an exceptionally rigid wall of true vertical construction, and at the same time insure against leakage between adjacent logs of the wall.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawings:

Figure 1 is a plan view of a log cut in accordance with the invention prior to removal of the wedge-shaped core or center.

Fig. 2 is a plan view after the wedge-shaped center or core has been removed, and the upper surface of the log has been squared.

Fig. 3 is an end view of a log prior to the cutting and removal of the sections therefrom.

Fig. 4 is an end elevational view of a complete log sawed in accordance with the present method, the slabs being connected by dowels.

Fig. 5 is an end elevational view showing the sections or slabs formed by the present method, connected by nails.

Fig. 6 is a plan view of a modified form of the invention, wherein the longitudinal cuts terminate short of one end of the log.

Fig. 7 is an end elevational view illustrating a modified form of log construction, the logs being placed together in the formation of a wall.

Fig. 8 is a fragmental side elevational view of a wall.

Fig. 9 is an end elevational view illustrating a further modified form of log defining longitudinal shoulders that interlock when the logs are positioned together in the formation of a wall.

Fig. 10 is a fragmental side elevational view of the wall.

Fig. 11 is an end elevational view illustrating another modified form of the invention.

Fig. 12 is an end elevational view of still another modified form of the invention.

Referring to the drawing in detail, the method followed in carrying out the present invention, embodies cutting the usual tapered log longitudinally and in predetermined spaced relation with both the front and rear surfaces of the log, as at 5, removing the wedge-shaped center section 6 formed by so cutting the log, thereby providing boards or slabs 7 with flat inner complementary surfaces, while the outer surfaces of the boards retain the original bark covered or surface contour.

The boards or slabs 7 are now brought together with their flat surfaces contacting each other, the boards or slab sections being now secured together as by means of dowel pins 8. These dowel pins are disposed diagonally with respect to the outer surfaces of the boards or slab sections, the dowels being arranged to cross each other on a line drawn longitudinally through the center of the log which has been formed by the present method, the angular positioning of the dowels lending strength to the finished log.

In lieu of the dowels 8, it is also contemplated to connect the boards or slab sections by driving nails 9 or other suitable members diagonally through the adjacent slabs, as shown by Fig. 5.

In the modified form of the method as shown by Fig. 6, the log is cut along lines 11, the cuts terminating short of one end of the log as at 12, the wedge-shaped core or center of the log indicated at 13 being removed and the adjacent surfaces of the boards or slab sections are clamped together and secured as by means of dowels, nails or the like.

In the modification of the invention, it will be seen that the log or slab sections are securely held together at one end of the log adding strength to the log.

In the modified form of the invention, as shown by Figs. 7 and 8 of the drawings, the slabs 12 are placed together with their flat surfaces in contact, the slabs 12 being offset with respect to each other to provide shoulders 13 along the longitudinal upper and lower edges of the logs.

In the form of the invention as shown by Figs. 9 and 10 of the drawings, the slabs 14 are formed by cutting longitudinal wedge-shaped sections from the centers of the timbers and sawing the upper and lower edges of one of the slabs of each log longitudinally to provide inclined surfaces 15. In this form of the invention the slabs are secured together by means of pins 16, the slabs being slightly offset vertically with respect to each other providing longitudinal shoulders 17 along the upper and lower edges thereof.

From the foregoing it will be seen that due to the construction as illustrated in the modified forms of the invention, the logs when positioned one upon another in the erection of a wall, will be held against lateral movement with respect to each other, by the contacting shoulders of the upper and lower surfaces of the logs, thereby insuring against leakage between adjacent upper and lower logs and at the same time provide logs which may be placed one upon another in the formation of a wall, by persons unfamiliar with building construction, insuring a true vertical wall at all times.

As shown by Fig. 11 of the drawings, the usual supporting logs are cut longitudinally in a manner described and the flat surfaces of the logs brought together. Extensions 20 are formed on the logs and disposed longitudinally along one edge thereof, while the opposite edges of the logs are cut away as at 21, providing a recess longitudinally of the logs.

In the form shown by Fig. 12, a tapered longitudinal extension 22 is provided, while a tapered recess 23 is provided along the opposite edge. These recesses and enlargements or ribs are provided so that when logs are positioned one upon another, they will be anchored to hold them in proper alinement.

It will further be seen that due to the construction shown and described, I have provided a method of cutting logs so that the upper and lower surfaces thereof will be parallel, while the outer and inner surfaces of walls formed by logs cut in accordance with the method, will be in alinement.

Further, the logs will be of uniform thicknesses with square surfaces for contact in building a wall.

Having thus described the invention, what is claimed is:

1. The method of producing building logs from rough timber, consisting in sawing a log longitudinally in a line parallel with the outer surface of the log, providing slab sections of uniform thickness with flat inner surfaces, placing the flat inner surfaces together, securing the slab sections together, and finally forming flat upper and lower surfaces longitudinally of the log.

2. The method of producing building logs, consisting in sawing a log longitudinally throughout its entire length in lines parallel with the outer and inner surfaces of the logs providing slab sections of uniform thickness with flat inner surfaces, placing the flat inner surfaces together, extending securing pins transversely through the adjacent slab sections securing the slab sections together, and finally squaring the upper and lower surfaces of the log.

3. The method of producing building logs, consisting in removing a wedge-shaped center section from a log providing slab sections having parallel outer and inner surfaces, securing the slab sections together with their inner surfaces in contact, and finally squaring the upper and lower surfaces of the log.

4. The method of producing building logs, consisting in removing a longitudinally wedge-shaped center section from a log, providing slab sections having parallel outer and inner surfaces, securing the slab sections together with their inner surfaces contacting, and with the upper and lower surfaces of one slab offset with respect to the upper and lower surfaces of the contacting slab, forming shoulders longitudinally of the building logs.

ROBERT B. BLACKMORE.

No references cited.